April 20, 1943.  H. F. BETKE  2,317,323
RESILIENT TIRE
Filed Oct. 23, 1942
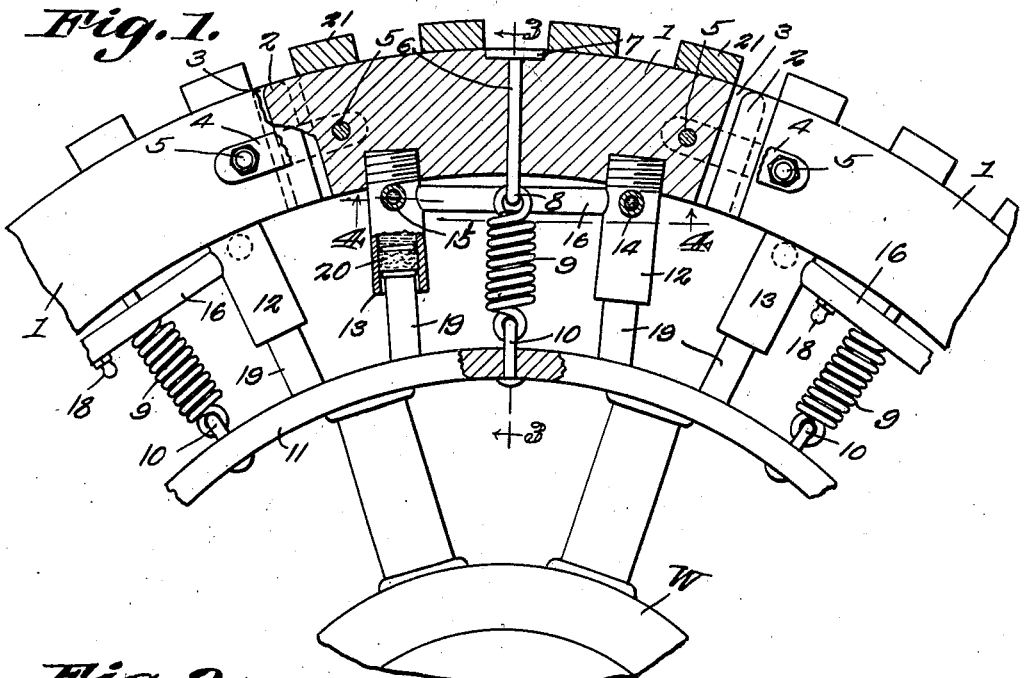
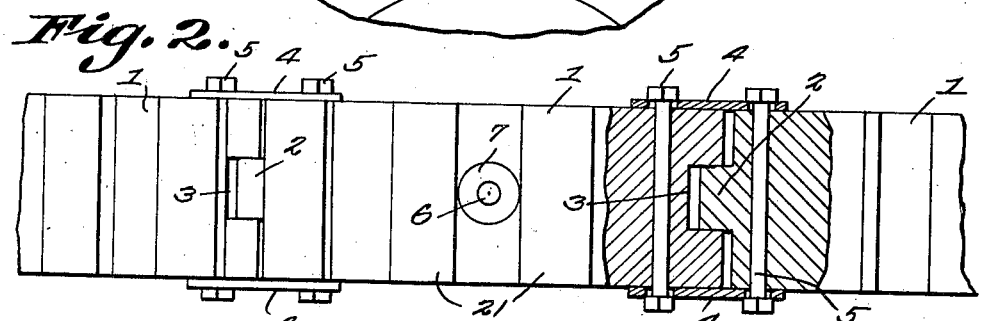
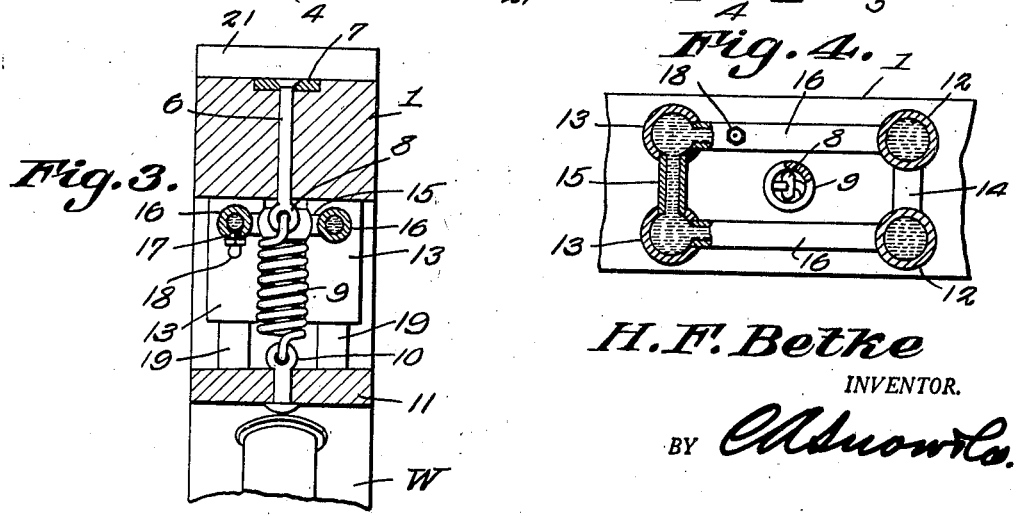
H. F. Betke
INVENTOR.

Patented Apr. 20, 1943

2,317,323

UNITED STATES PATENT OFFICE 2,317,323

RESILIENT TIRE

Herman F. Betke, Borger, Tex.

Application October 23, 1942, Serial No. 463,111

3 Claims. (Cl. 152—55)

This invention relates to a resilient tire for use in connection with the wheels of motor vehicles, one of the objects being to provide a tire consisting of movably connected segmental sections each of which is held normally in its outermost position by fluid contained within communicating cylinders, these cylinders being mounted for reciprocation on fixed pistons.

A further object is to provide a means for holding each tire section yielding under restraint with the fluid substantially evenly distributed within the cylinders of each section.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figure 1 is a view partly in side elevation and partly in section of a portion of a tire embodying the present improvements, a portion of the wheel on which it is mounted also being shown.

Figure 2 is a plan view of the structure shown in Fig. 1, portions of two of the segments being shown in section.

Figure 3 is a section on line 3—3, Fig. 1.

Figure 4 is a section on line 4—4, Fig. 1.

Referring to the figures by characters of reference, I designates an arcuate or segmental block formed preferably of a suitable wood although other material might be used to advantage. This block is provided at one end with a central tongue 2 and at its other end with a central recess 3, the recess being so proportioned as to receive, for working movement, the tongue 2 of another section I. The number of the sections I employed can vary but it is essential that all of the sections be the same in size and proportions and that the sections, when properly assembled, form a complete ring.

The tongues 2 are not directly connected to the recessed ends of the adjoining sections but the sections are held together by links 4 fastened to the sides of the meeting end portions of the sections I by bolts 5 extending through the ends of the links and transversely through the tire sections. Thus each section I is free to both rock and slide relative to the next adjoining section.

An eye-bolt 6 is extended radially through the center of each section I and preferably has a head 7 at its outer end substantially flush with the corresponding surface of the tire section. The inner end of the bolt 6, which is the end projecting beyond the concave surface of the section, has an eye 8 engaged by one end of a coiled spring 9 the other end of which is anchored, as at 10, to a rim 11. This rim, which is circular, can constitute a part of a wheel W as shown or, if preferred, could be so made as to extend around and be carried by the ordinary wheel rim.

Each section I is provided with two pairs of cylinders 12 and 13 respectively, the cylinders of each pair being joined close to the section I by a tubular connection 14 while a similar tubular connection 15 joins the cylinders 13 close to the inner or concave surface of the section I. The cylinders can be embedded in the sections so as to be rigidly joined thereto and closed thereby and for the purpose of maintaining communication between the cylinders of the two pairs, tubes 16 which are parallel to each other and close to the inner surface of section I, can extend from the cylinders 12 to the corresponding cylinders 13 as shown particularly in Fig. 4. One of these tubes can be provided with a filling opening 17 normally closed by fitting 18.

Extending from the rim 11 are plungers 19 which extend into the respective cylinders 12 and 13 and have heads 20 which can be of resilient material and maintain a tight working fit against the cylinders while at the same time permitting a slight rocking movement of the cylinders relative to the plungers.

It will be noted, by referring to Fig. 1, that the plungers 19 and the cylinders 12 and 13 are not disposed radially relative to the wheel W or to the rim 11 but cylinders 12 and 13 and their plungers associated with each section I converge slightly toward the axis of rotation of the wheel. It has been found that by arranging the parts as described and shown each section I is permitted to swing inwardly toward the rim I to a limited extent without a corresponding inward movement of the other end being produced and, likewise, a limited inward radial movement of each section I is possible. This is due to the resilient nature of the heads 20 and to the further fact that the plungers 19 are spaced from the walls of their cylinders.

The cylinders and their connecting tubes are filled with grease through the opening 17 which is closed by the grease fitting 18. When the cylinders are thus filled the grease therein is held under compression by the action of the spring 9, a sufficient amount of grease being contained within the cylinders and their connections to insure support of section 1 substantially in its outermost position as shown in Fig. 1.

When the tire is in use on a wheel the weight of a load transmitted to the lowermost section will cause said section to thrust upwardly against the grease in the cylinder, the advancing end of each section first swinging inwardly toward the center of the wheel so that grease under said end will be expelled partially from its cylinders through the connecting tubes to the other cylinders of said section. As the center of each section comes in contact with the supporting surface thereunder, the pressure to which the section 1 is subjected will become equalized and all of the cylinders will be thrust longitudinally of their plungers 19. As the lowermost section 1 brings its other end into contact with the supporting surface as the wheel continues to rotate, that end will be pushed toward the adjacent plungers 19 while the cylinders at the other end of the section will swing outwardly on their plungers.

Should the fit between the pistons and the respective cylinders be unyielding the foregoing operation of course would not be possible but as the cylinders have yielding heads which are adaptable to changing positions of the cylinders and plungers, the slight relative movement necessary to permit rocking and sliding movement of the tire sections can be effected and in every case the grease which is trapped in the cylinders and their tubular connections, will serve to yieldingly resist such action and ultimately, through the aid of the spring 9, restore the section 1 to its normal position as illustrated in Fig. 1.

The sections 1 can be provided on their outer or convex surfaces with cleats 21 or other suitable means for insuring desired traction, these cleats being made of any desired material.

What is claimed is:

1. A vehicle tire including a rim, outwardly extended plungers arranged in pairs, the plungers of each pair being parallel and the plungers of one pair diverging outwardly relative to the plungers of the other pair, all of the plungers being fixed relative to the rim, cylinders mounted to slide on the respective plungers and having a limited swinging movement relative thereto, piston heads on the plungers and within the cylinders, tubular connections between the cylinders of each pair and between the corresponding cylinders of the two pairs, a fluid filling the tubular connections and the cylinders and maintained under compression by the pistons, a tire section fixedly connected to and closing the outer ends of the connected pairs of cylinders, and a resilient connection between the center of said section and the rim, said connection being radially disposed relative to the rim.

2. A vehicle wheel including a rim, separate arcuate tire sections normally concentric with but spaced from the rim, said sections having interfitting relatively movable ends, swinging pivotal connections between the sections, opposed pairs of cylinders extending inwardly from each section and closed by the section, said cylinders being positioned adjacent to the ends of the sections, tubular connections between the cylinders of the opposed pairs and between the cylinders of each pair, plungers fixedly joined to and extending outwardly from the rim into the respective cylinders, piston heads on the plungers and within the respective cylinders, each of said cylinders being proportioned to slide and rock relative to its plunger, and a resilient connection between the center of each section and the rim.

3. A vehicle wheel including a rim, separate arcuate tire sections normally concentric with but spaced from the rim, said sections having interfitting relatively movable ends, swinging pivotal connections between the sections, opposed pairs of cylinders extending inwardly from each section and closed by the section, said cylinders being positioned adjacent to the ends of the sections, tubular connections between the cylinders of the opposed pairs and between the cylinders of each pair, plungers fixedly joined to and extending outwardly from the rim into the respective cylinders, piston heads on the plungers and within the respective cylinders, each of said cylinders being proportioned to slide and rock relative to its plunger, a lubricant filling the cylinders and their connections and retained in the cylinders by the pistons, and a resilient connection between the center of each section and the rim.

HERMAN F. BETKE.